United States Patent
Lai

(10) Patent No.: US 7,335,044 B2
(45) Date of Patent: Feb. 26, 2008

(54) SMALL-SIZED CARD CONNECTOR

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/500,288

(22) Filed: Aug. 8, 2006

(65) Prior Publication Data

US 2007/0184702 A1 Aug. 9, 2007

(30) Foreign Application Priority Data

Feb. 7, 2006 (TW) .............................. 95202200 U

(51) Int. Cl.
*H01R 13/62* (2006.01)
(52) U.S. Cl. ..................... 439/326; 439/159; 439/630; 439/923
(58) Field of Classification Search ............... 439/159, 439/326, 630
See application file for complete search history.

(56) References Cited

U.S. PATENT DOCUMENTS

| | | | | |
|---|---|---|---|---|
| 6,099,337 | A * | 8/2000 | Chan ........................... | 439/326 |
| 6,174,186 | B1 * | 1/2001 | Hashiguchi et al. ......... | 439/260 |
| 6,174,188 | B1 * | 1/2001 | Martucci ..................... | 439/326 |
| 6,193,557 | B1 * | 2/2001 | Luvini et al. ................ | 439/630 |
| 6,210,193 | B1 * | 4/2001 | Ito et al. ..................... | 439/326 |
| 6,461,193 | B1 * | 10/2002 | Matthies ...................... | 439/509 |
| 6,881,086 | B2 * | 4/2005 | Ohashi ......................... | 439/326 |
| 6,890,203 | B2 * | 5/2005 | Matsunaga et al. .......... | 439/331 |
| 6,893,281 | B2 * | 5/2005 | Taguchi ....................... | 439/326 |
| 7,160,129 | B2 * | 1/2007 | Yin ............................ | 439/331 |
| 7,238,038 | B2 * | 7/2007 | Kumagai ..................... | 439/326 |
| 2001/0005655 | A1 * | 6/2001 | Cabane et al. ............... | 439/630 |
| 2004/0092149 | A1 * | 5/2004 | Scuteri et al. ............... | 439/326 |
| 2005/0048828 | A1 * | 3/2005 | Ho et al. ..................... | 439/326 |
| 2005/0239312 | A1 * | 10/2005 | Pan ............................. | 439/326 |
| 2005/0255734 | A1 * | 11/2005 | Liu ............................. | 439/326 |
| 2006/0141839 | A1 * | 6/2006 | Tseng et al. ................. | 439/326 |
| 2006/0205258 | A1 * | 9/2006 | Cho et al. .................... | 439/326 |
| 2007/0202732 | A1 * | 8/2007 | Yahiro et al. ................ | 439/326 |

FOREIGN PATENT DOCUMENTS

TW M285819 1/2006

* cited by examiner

*Primary Examiner*—Tho D. Ta
*Assistant Examiner*—Larisa Tsukerman
(74) *Attorney, Agent, or Firm*—Bacon & Thomas, PLLC

(57) ABSTRACT

A small-sized card connector includes a base frame being open at an upper side thereof and having a receiving space formed therein for receiving a card inserted from the upper side thereof, a retaining wall formed at a rear end thereof and facing the receiving space, a stop portion formed at the rear end thereof and located above the receiving space, and a first hollow portion formed at the rear end thereof; a plurality of terminals mounted to the base frame, each having an end extending into the receiving space and located at a front section of the receiving space; a limiting member mounted to the base frame and located above a front end of the receiving space; and the springy member mounted to the base frame and located at the front end of the receiving space for generating rebounding resilience working toward a rear end of the receiving space.

6 Claims, 5 Drawing Sheets

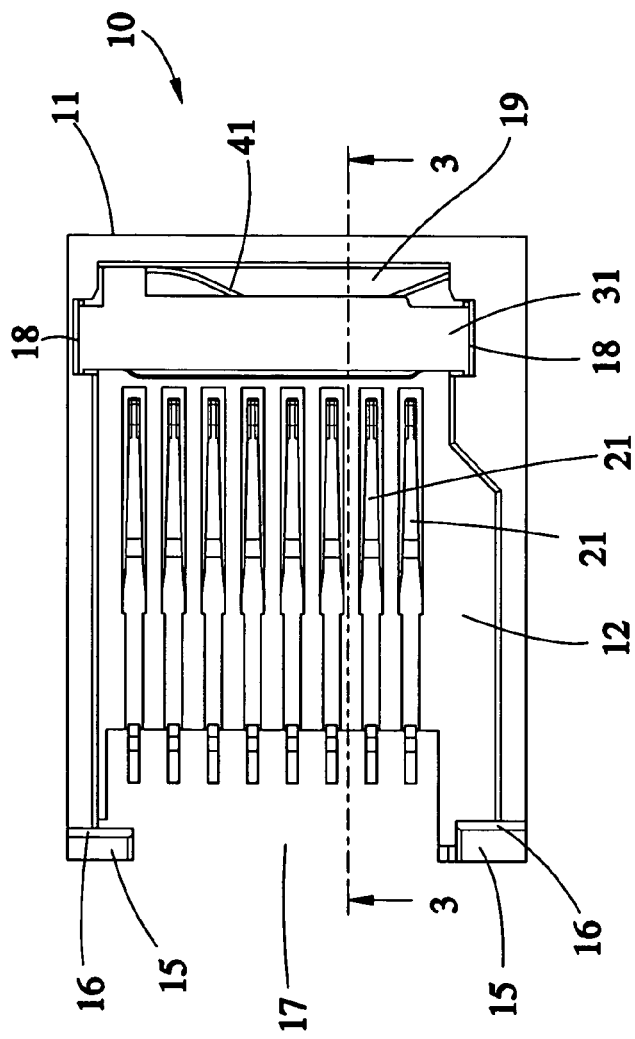
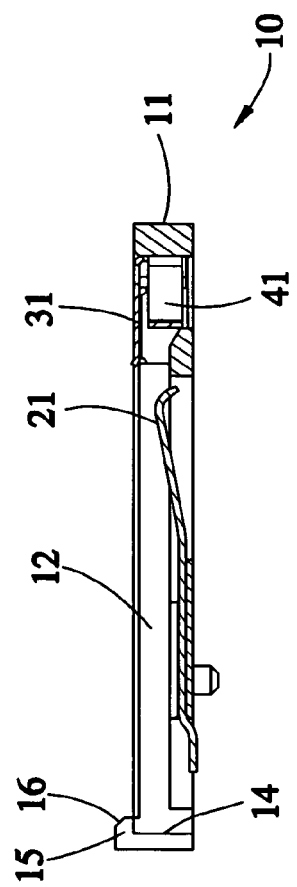
FIG.2
FIG.3

SMALL-SIZED CARD CONNECTOR

BACKGROUND OF THE INVENTION

1. Field of the Invention

The present invention relates generally to electronic apparatuses, and more particularly, to a small-sized card connector.

2. Description of the Related Art

A connectional small-sized card connector, as disclosed in Taiwan Patent No. M285819, is designed for mini SD cards, as shown in FIGS. 8 and 9, being structurally characterized by that its base plate 20 has a stopper 131 formed at a front end thereof for contacting against and stopping an inserted card 200 from upward movement biased by terminals 30 and further for positioning the card 200. In fact, in addition to the stopper 131, a hook formed at a rear side of the base plate 20 is still needed to hook a slot 202 of the card 200 to keep the card stably positioned.

However, there are two drawbacks for the above-mentioned conventional card connector.

1. While inserting the card, the user's finger holds a front end of the card and then inserts a read end of the card into the card connector, such that the finger tends to touch contact pins of the card connector, which are subject to oxidization due to salinity and water on the finger.
2. While ejecting the card, the user has to push the card backward with the finger and then raise the card to take it out. However, while pushed backward, the card tends to be pushed to and stopped at a front edge of the base plate to further incur unsmooth ejecting action. The user has to push the card backward very carefully. In addition, while pushing the card backward, the user's finger tends to touch the base plate and the terminals, which are also subject to oxidization due to the salinity and the water on the finger.

SUMMARY OF THE INVENTION

The primary objective of the present invention is to provide a small-sized card connector, which operation of insertion and ejection of the card is user-friendly and neither blockade nor unsmooth problem will happen.

The secondary objective of the present invention is to provide a small-sized card connector, in which the user's finger does not tend to touch contact pins of a card or terminals of the card connector and neither the contact pins nor the terminals are subject to oxidization during the insertion and ejection of the card.

The foregoing objectives of the present invention are attained by the small-sized card connector composed of a base frame, a plurality of terminals, a limiting member, and a springy member. The base frame is open at an upper side thereof, having a receiving space formed therein for receiving a card inserted from the upper side thereof, a retaining wall formed at a rear end thereof and facing the receiving space, a stop portion formed at the rear end thereof and located above the receiving space, and a first hollow portion formed at the rear end thereof. The terminals are mounted to the base frame, each having an end extending into the receiving space and located at a front section of the receiving space. The limiting member is mounted to the base frame and located above a front end of the receiving space. The springy member is mounted to the base frame and located at the front end of the receiving space for generating rebounding resilience working toward a rear end of the receiving space. In light of this, the insertion and the ejection of the card are smooth and the user's finger is prevented from touching the contact pins of the card.

BRIEF DESCRIPTION OF THE DRAWINGS

FIG. 2 is a top view of the preferred embodiment of the present invention.

FIG. 3 is a sectional view taken along a 3-3 line indicated in FIG. 2.

DETAILED DESCRIPTION OF PREFERRED EMBODIMENTS

Figure 1:
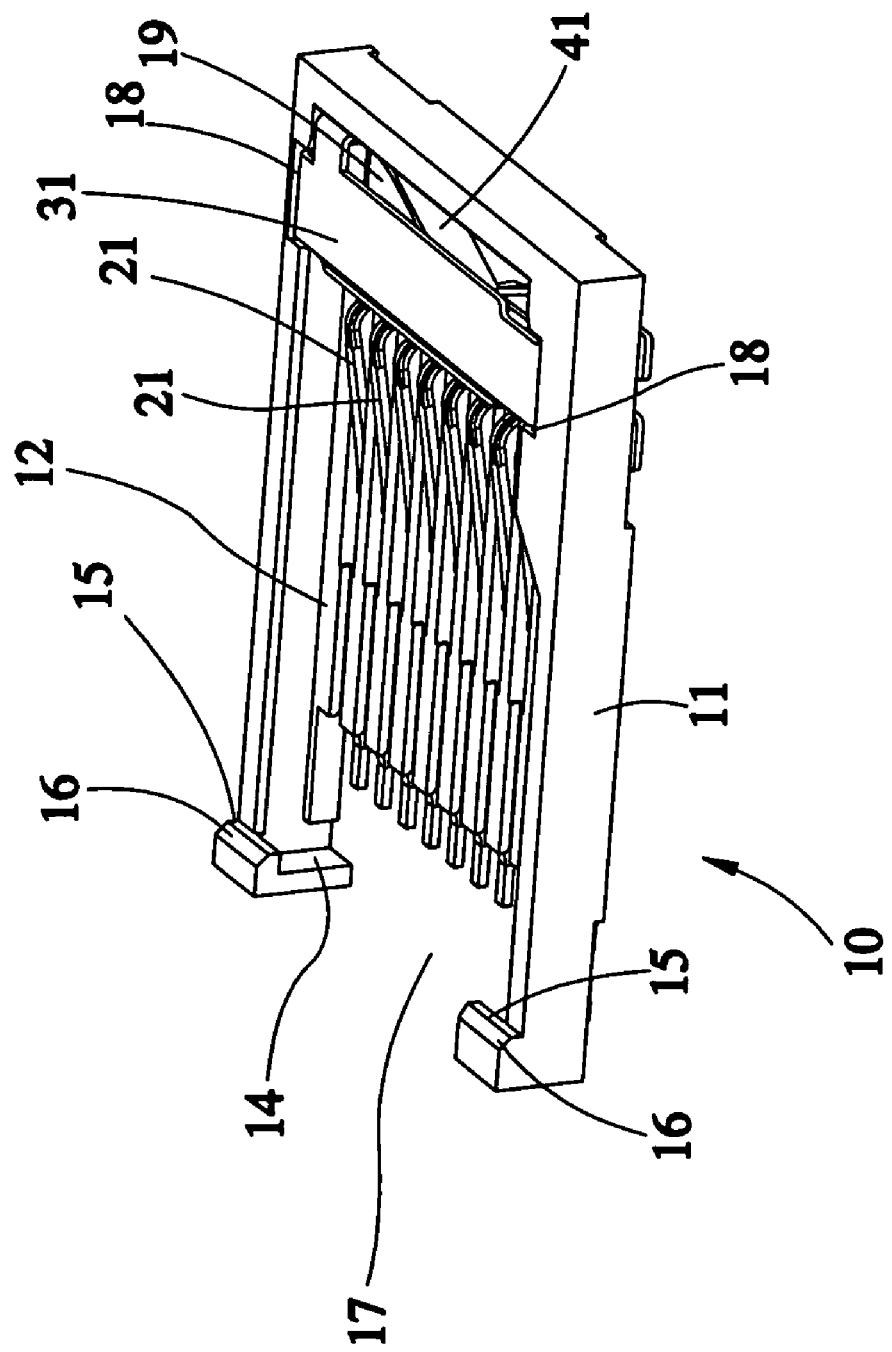
FIG. 1 is a perspective view of a preferred embodiment of the present invention.
Figure 4:
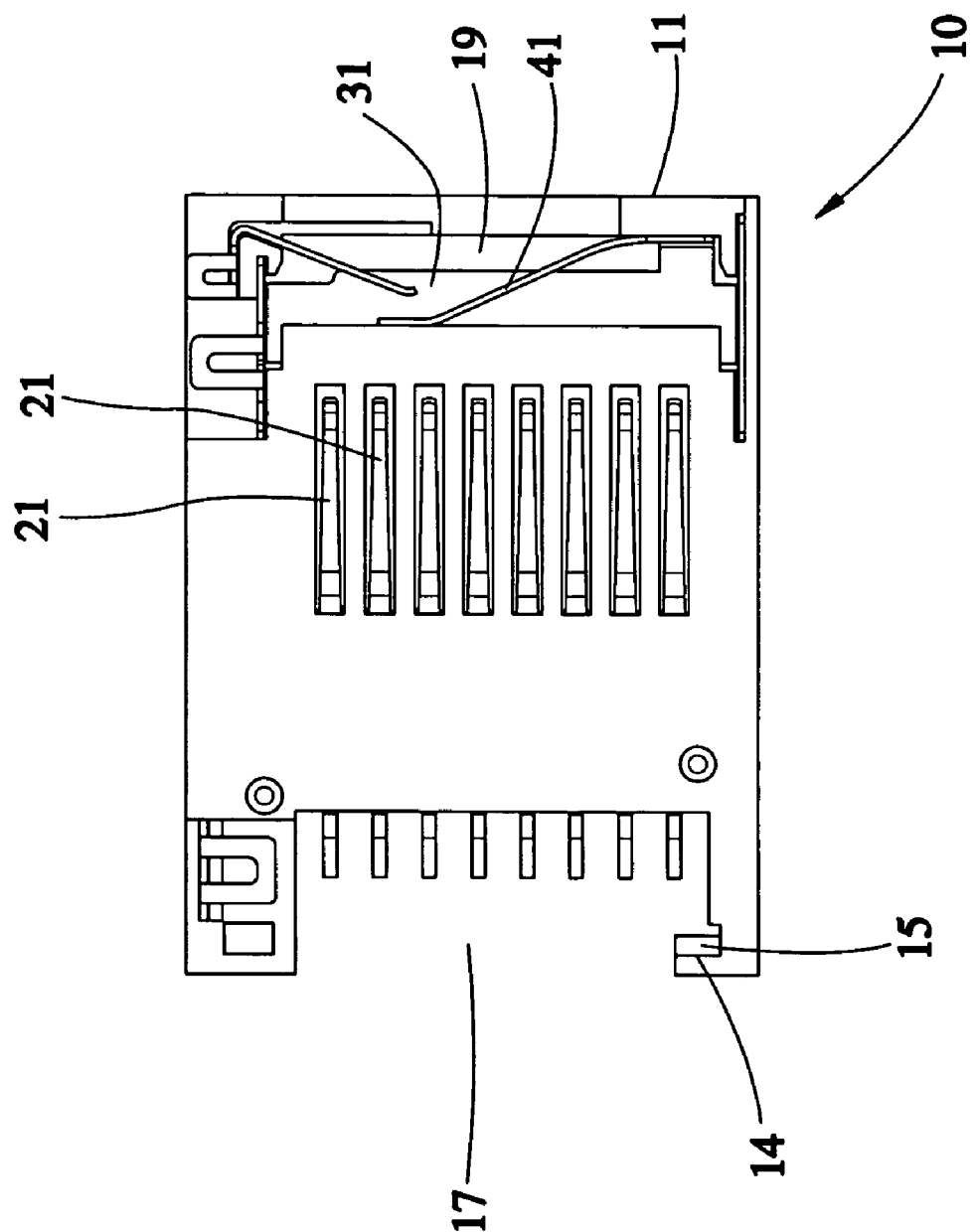
FIG. 4 is a bottom view of the preferred embodiment of the present invention.

Referring to FIGS. 1-4, a small-sized card connector 10 constructed according to a preferred embodiment of the present invention is composed a base frame 11, a plurality of terminals 21, a limiting member 31, and a springy member 41.

The base frame 11 is open at an upper side thereof, having a receiving space 12 formed therein for receiving a card 99 inserted from the upper side thereof. The base frame 11 includes a retaining wall 14 formed at a rear end thereof and facing the receiving space 12, a stop portion 15 formed at the rear end thereof and located above the receiving space 12, a bevel 16 formed on the stop portion 15 and inclining forward and downward, a first hollow portion 17 formed a the rear end thereof, two slots 18 formed at bilateral sides of a front section thereof, and a second hollow portion 19 formed at a bottom side of the front section thereof.

The terminals 21 are mounted to the base frame 11, each having an end extending into the receiving space 12.

The limiting member 31 is embodied as a plate, having two ends bended downward and extending into the two slots 18 respectively to be mounted to the base frame 11. The limiting member 31 is located above a front end of the receiving space.

The springy member 41 is embodied as a tongue, mounted to the base frame 11 and located at the front end of the receiving space 12 for generating rebounding resilience working toward a rear end of the receiving space 12 under pressure.

Figure 5:
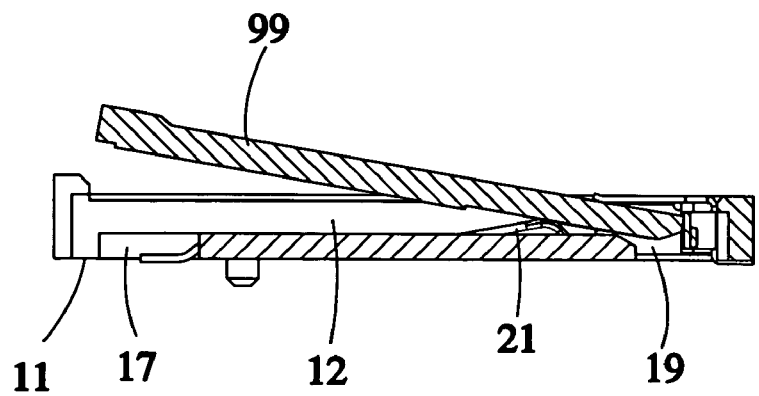
FIG. 5 is a sectional schematic view of the preferred embodiment of the present invention at work, illustrating that the card is being inserted into the card connector.
Figure 6:
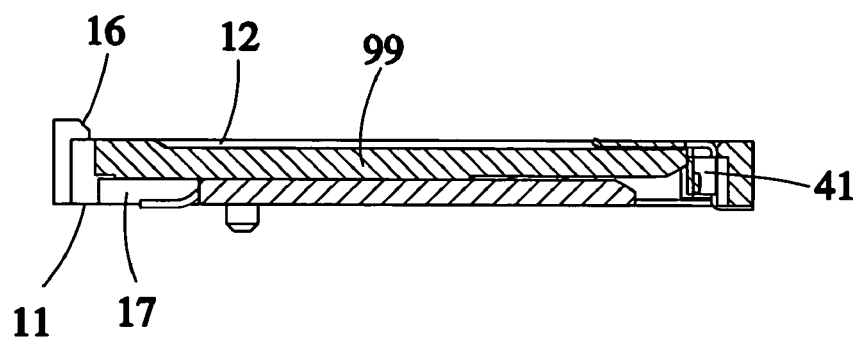
FIG. 6 is a sectional schematic view of the preferred embodiment of the present invention at work, illustrating that the card contacts against the springy member after inserted into the card connector.
Figure 7:
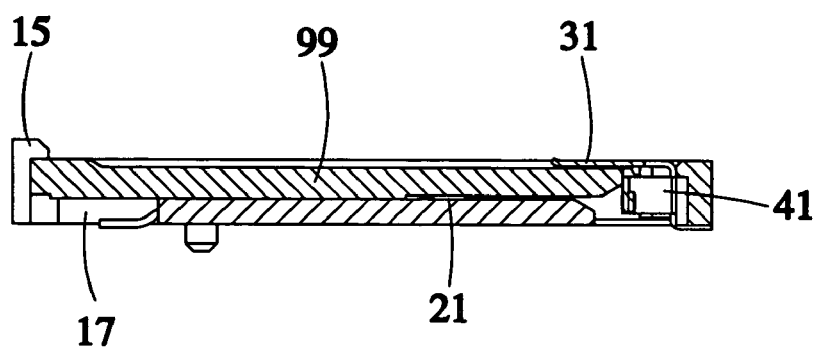
FIG. 7 is a sectional schematic view of the preferred embodiment of the present invention at work, illustrating that the card is finally positioned after inserted into the card connector.
Figure 8:
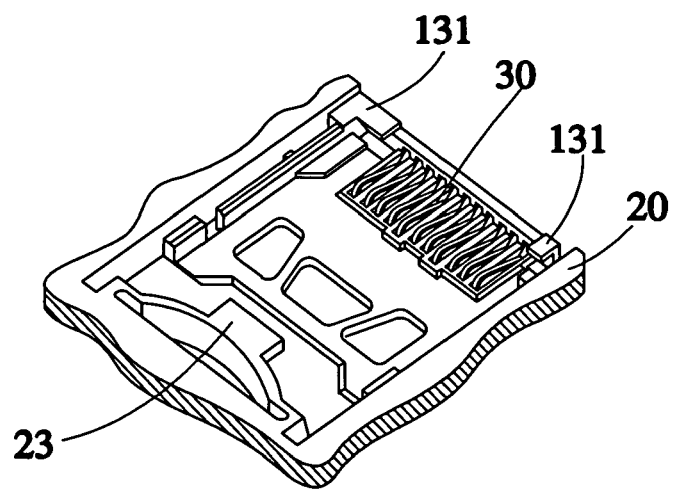
FIG. 8 is a perspective view of the conventional card connector.
Figure 9:
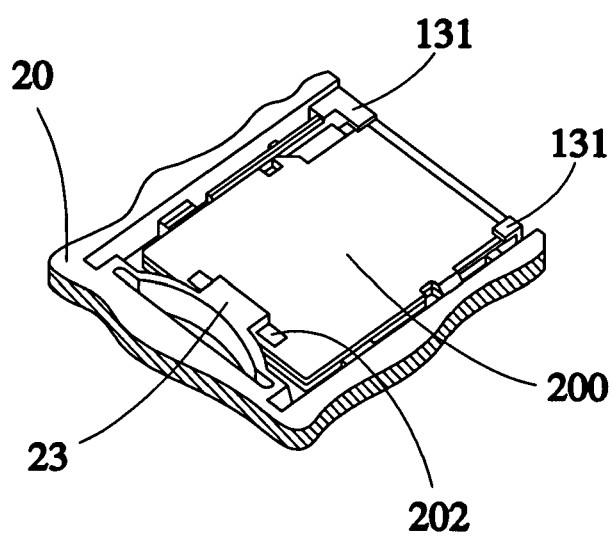
FIG. 9 is a perspective view of the conventional card connector in use.

FIG. 3 illustrates when the card is not inserted into the card connector 10. Referring to FIG. 5, while the card 99 is inserted, the user holds a rear end of the card 99 having metallic contact pins (not shown) at the other front end thereof and then inserts the front end of the card 99 into the receiving space 12 of the base frame 11 at a predetermined angle. While the card 99 is inserted into the card connector 10, the front end of the card 99 partially enters the second hollow portion 19 to avoid the interruption of the limiting member 31. Referring to FIG. 6, the card 99 is inserted further into the base frame, and meanwhile, the springy member 41 is under pressure to generate backward rebounding resilience, and then a rear end of the card 99 works with the bevel 16 to successfully slide into the receiving space 12. Next, as shown in FIG. 7, the user releases the card 99, and then the springy member 41 pushes the card 99 with its rebounding resilience to move back to the retaining wall 14 and to be finally positioned. In the meantime, the terminals 21 work on the card 99 and both of the limiting member 31 and the stop portion 15 hold the front and rear ends of the card 99, such that the card 99 will not be raised by the terminals 21, thus completing the insertion of the card 99.

While ejecting the card 99 from the card connector 10, the user can push the card 99 forward with the finger to disengage the card 99 from the stop portion 15. During the period that the finger pushes the card 99, the finger is located in the first hollow portion 17 and will not push against the base frame 11. After the rest of the follow-up steps of the ejection, which are contrary to the sequence of those of the aforementioned insertion, are done, the user can take out the card 99.

As indicated above, the present invention includes the following advantages.

1. Finger not Subject to Contact with Contact Pins of the Card

During the operation, the user holds the rear end of the card to uneasily touch the contact pins of the card; while the card is being ejected, the terminals of the card connector are not subject to contact with the hand, such that neither the contact pins nor the terminals are subject to contact with the salinity and the water of the finger and thus not subject to oxidization relatively.

2. User-Friendly Insertion and Ejection of the Card

During the insertion of the card into the card connector, the card can more easily slide into the receiving space with the aid of the bevel. During the ejection of the card, the user's finger pushes the card first and is free to move in the first hollow portion without contact with the base frame, such that the user will not feel unsmooth about the finger being stopped or limited.

Although the present invention has been described with respect to a specific preferred embodiment thereof, it is no way limited to the details of the illustrated structures but changes and modifications may be made within the scope of the appended claims.

What is claimed is:

1. A small-sized card connector comprising:
   a base frame being open at its upper side, said base frame having a receiving space formed therein for receiving a card inserted from the upper side thereof, a retaining wall formed at a rear end of the receiving space and facing said receiving space, a stop portion formed at the rear end of the receiving space and located above said receiving space, and a first hollow portion formed at the rear end of said receiving space;
   a plurality of terminals mounted to said base frame, each of said terminals having an end extending into said receiving space and located at a front section of said receiving space;
   a limiting member mounted to said base frame and located above a front end of said receiving space; and
   a springy member mounted to said base frame and located at the front end of said receiving space for generating rebounding resilience to push a card toward said retaining wall, said card being held in said receiving space against said terminals by said stop portion at the rear end of the receiving space and said limiting member at a front end of said receiving space.

2. The small-sized card connector as defined in claim 1, wherein said limiting member is a plate having two ends mounted to said base frame.

3. The small-sized card connector as defined in claim 2, wherein said base frame comprises two slots formed at bilateral sides of a front section thereof; said limiting member comprises two ends bended downward and extending into said two slots.

4. The small-sized card connector as defined in claim 1, wherein said stop portion comprises a bevel inclining forward and downward.

5. The small-sized card connector as defined in claim 1, wherein said base frame comprises a second hollow portion formed at a bottom side of the front section thereof.

6. The small-sized card connector as defined in claim 1, wherein said springy member is a tongue.

\* \* \* \* \*